April 29, 1952 — H. G. ANDRÉ — 2,594,711
ZINC-SILVER ACCUMULATOR
Filed Dec. 20, 1948 — 2 SHEETS—SHEET 1

INVENTOR
HENRI G. ANDRE
BY Karl F. Ross
AGENT

April 29, 1952     H. G. ANDRÉ     2,594,711
ZINC-SILVER ACCUMULATOR
Filed Dec. 20, 1948     2 SHEETS—SHEET 2
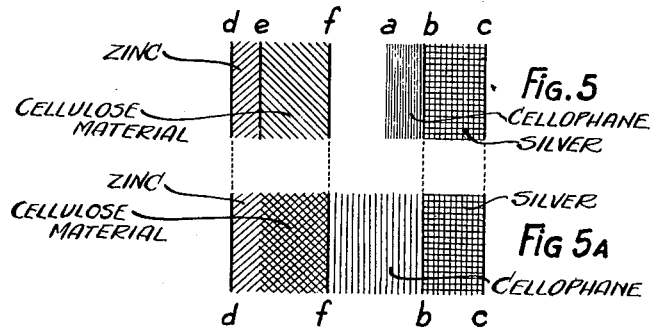
Fig. 5
Fig. 5A
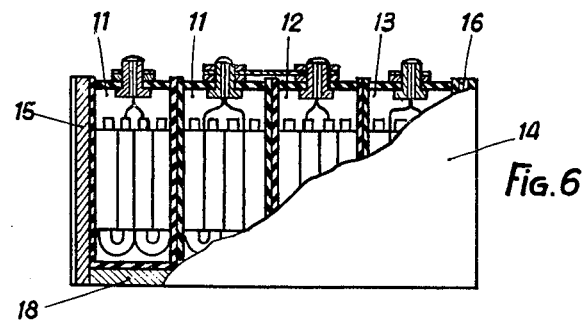
Fig. 6
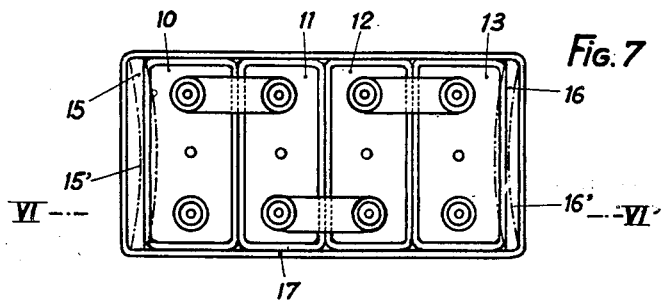
Fig. 7
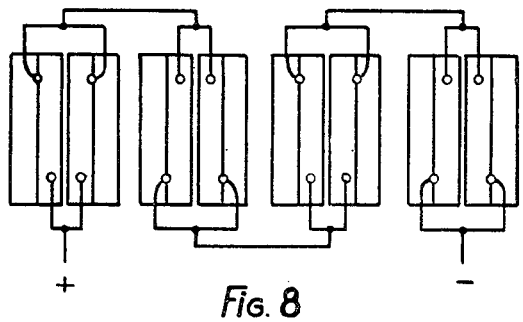
Fig. 8
INVENTOR
HENRI G. ANDRE
BY Karl F. Ross
AGENT Patented Apr. 29, 1952

2,594,711

UNITED STATES PATENT OFFICE 2,594,711

ZINC-SILVER ACCUMULATOR

Henri G. André, Montmorency, France, assignor to Yardney International Corp., New York, N. Y., a corporation of New York Application December 20, 1948, Serial No. 66,292
In France July 28, 1948

8 Claims. (Cl. 136—6)

My invention relates to zinc-silver accumulators of the type including a negative insoluble electrode, provided with a cellulosic diaphragm separating the electrodes and containing an alkaline electrolyte wherein, once the accumulator is formed, the following electrochemical reaction takes place:

$$2AgO + H_2O + 2Zn \rightleftarrows 2Ag + Zn(OH)_2 + ZnO \quad (1)$$

(Charge of accumulator) (Discharge of accumulator)

The operation according to such a cycle is obtained by virtue of the compression of the diaphragms, which compression has for its result a slowing down of the circulation of the electrolyte and prevents the precipitation of the zinc inside the diaphragms.

When operating under the conditions actually preferred the zinc may in fact be transformed solely into zinc hydroxide and instead of the above written reaction the following takes place:

$$AgO + H_2O + Zn \rightleftarrows Ag + Zn(OH)_2 \quad (2)$$

(Charge of accumulator) (Discharge of accumulator)

Whether or not there is a formation of zinc oxide, it will be noticed that in principle the salt contents of the electrolyte do not interfere with the chemical reactions, taking into account that the charge is finished before the alkaline zincate contained in the electrolyte begins being electrolytically dissociated. The formation of water during the charging of the accumulator allows operating with a small amount of electrolyte, whereas the insolubility of the zinc in the electrolyte allows reducing the amount of zinc and all the more so when the operation approximates more closely the relationship (2). It is therefore apparent that the accumulators according to my invention will have a power to weight ratio that is much larger than in the case of accumulators operating with soluble zinc which accumulators require a much larger amount of zinc and electrolyte for their proper operation.

I will now describe according to my present invention and referring to accompanying drawings means for obtaining the suitable compression of the diaphragms. I will also describe further improvements, in particular a novel manner of executing the electrodes and the provision of porous elements lying in contact with the zinc.

In accompanying drawings:

Figs. 5 and 5a are diagrams illustrating the manner of selecting the thicknesses of the electrodes and diaphragms.

Fig. 6 is an elevational view partly sectional through line VI—VI' of Fig. 7, of an accumulator comprising several cells.

Fig. 7 is a plan view corresponding to Fig. 6.

Fig. 8 is a wiring diagram of the accumulator cells of Figs. 6 and 7.

Figure 1:
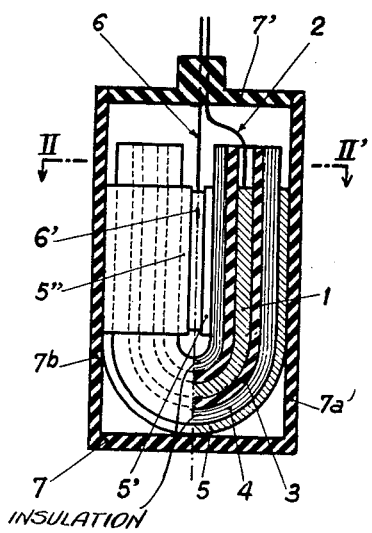
Fig. 1 is for a part a vertical section of an accumulator cell according to my invention through line I—I of Fig. 2, and for a part a front view.
Figure 2:
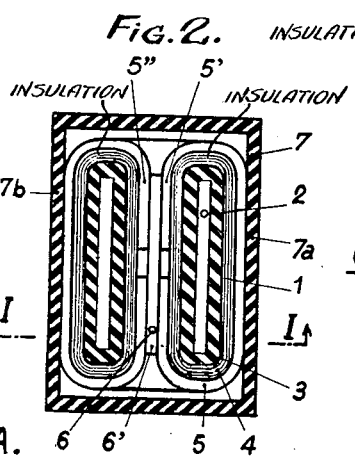
Fig. 2 is a cross-section through line II—II' of Fig. 1.

Figs. 1 and 2 show an accumulator cell including a positive electrode 1 of finely subdivided silver, a positive connection 2 secured to said electrode 1, a first wrapper 3 surrounding the anode 1 and made of viscose foil such as cellophane, a second wrapper of cellulosic paper 4 surrounding the wrapper 3, a zinc negative electrode 5 in H-shape which when unfolded surrounds the wrapper 4 and a silver negative connection 6 connected with a conductive plate 6' that may be of copper or silver for instance and is clamped between the two inwardly directed legs 5' and 5'' of the cathode 5, the whole being housed inside a container or casing 7 closed by a cover 7'.

Figure 3:
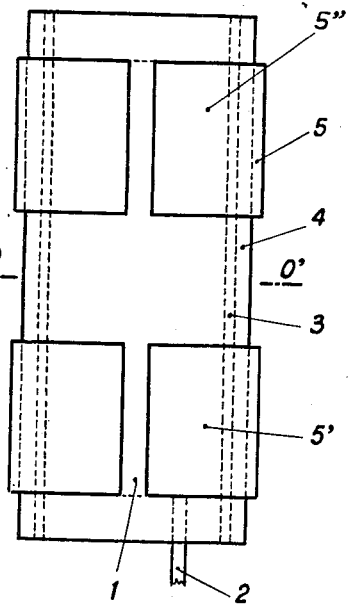
Figs. 3 and 4 show respectively in front view and in longitudinal section the system of electrodes and diaphragms of the cell illustrated in Fig. 1 before folding thereof.
Figure 4:
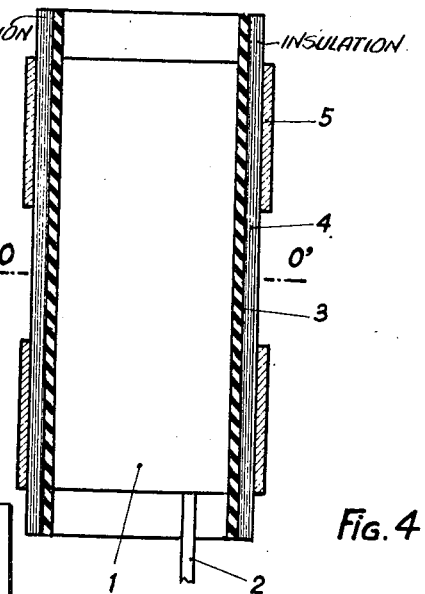
Figure 3A:
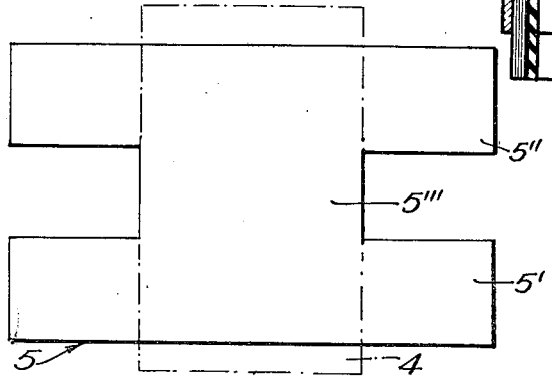
Fig. 3a is a developed view of the negative electrode shown in the preceding figures.

The system of elements 1 to 5 is first constituted as shown in Figs. 3, 3a and 4, the wrappers 3 and 4 being preferably constituted by a winding of several convolutions of a thin sheet of material round the positive plate 1; this system is then folded into U-shape round the line O—O'. The conductive plate 6' is clamped between the legs 5'—5'' of the negative electrode when the U-shaped system is being introduced into the accumulator casing. The cover 7' is sealed over the container 7 after the connections 2 and 6 have been caused to pass through said cover in register with the terminals. The thicknesses of the elements 1 to 5 are selected in a manner such that the system including said elements may be fitted when dry between the walls 7a and 7b of the container and that the expansion of this system following the introduction of the alkaline electrolyte and the formation of the accumulator may be limited by said two walls, the result being such a compression of the cellulosic material separating the electrodes that there is obtained a substantially exclusive formation of zinc hydroxide when the accumulator discharges.

The wrapping of the negative electrode about the package 1—4 is illustrated in Fig. 3a where this electrode is shown in its initial, developed position with the legs 5', 5'' extended from the central section 5'''. The wrapper 4, shown in dot-dash lines and assumed to envelop the elements 1, 2 and 3, is next placed above the negative electrode 5 so as to register with the said central section 5''' thereof. Thereafter the legs 5', 5'' are folded over to produce the arrangement shown in Fig. 3, whereupon the entire assembly can be folded about center line O—O' for introduction into the container 7.

Figs. 5 and 5a illustrate means for defining rapidly the thicknesses of the elements 1 to 5 in order to satisfy the above disclosed conditions. In these two figures, the distance $d$—$c$ is that comprised between the lateral walls of the container, for instance the walls 7a and 7b in the case of Figs. 1 and 2. In Fig. 5 the distance $d$—$e$ gives out the sum of the zinc thicknesses in the container and the distance $e$—$f$ gives out the sum of the thicknesses of the elements of cellulosic material; the distance $a$—$b$ corresponds to the sum of the thicknesses of the cellophane elements and the distance $b$—$c$ to the sum of silver thicknesses, all the elements mentioned being considered in their dry condition. It will be noticed that the sum of the thicknesses of all the elements is smaller than the distance $d$—$c$ between the container walls and that there exists a clearance given out by the distance $f$—$a$ in Fig. 5; this clearance allowing the easy introduction of the dry elements into the container.

The introduction of the electrolyte and the formation of the accumulator produce a swelling of the zinc and cellophane. If the walls of the container did not limit this swelling, the thickness of the cellophane would increase in the ratio of three to four times and that of the zinc might triple. As the container is designed so that the clearance $f$—$a$ may be only of a magnitude of about 1.5 times the distance $a$—$b$ and the container is undeformable or but little deformable, the consequence is a compression of all the elements considered and when the accumulator is formed the conditions are those illustrated in Fig. 5a; the zinc that occupied originally the breadth $d$—$e$ (Fig. 5) has been partly impregnated inside the cellulosic paper and occupies now the breadth $d$—$f$ while the cellophane impregnated with electrolyte occupies the space $f$—$b$ and the silver retains the breadth $b$—$c$. Under such conditions, the pressure exerted by the system of elements 1 to 5 (Figs. 1 to 4) on the side walls 7a and 7b of the container is of a magnitude of 10 to 20 kilograms per sq. dm. According to my invention, I provide containers adapted to support such a pressure either by increasing the thickness of the walls or by reinforcing the latter by suitable means; for instance, it is possible to use a metal container that is inwardly coated with an alkali-resistant substance such as rubber or styrolene resin or else said metal container may contain a lining made of such a substance the walls of which are thin and are fitted to a nicety inside the metal casing.

The thicknesses being selected as disclosed precedingly and the container being suitably reinforced, the phenomena occurring may be summarized as follows: when introducing the alkaline electrolyte, preferably potash in aqueous solution, the cellulosic elements 3 and 4 absorb this electrolyte, swell and are consequently compressed, whereby the electro-chemical reactions in the space separating the electrodes are slowed down and assume a different course when compared with those appearing in the usual zinc-silver accumulators.

The first charging of the accumulator produces and oxidation of the silver positive electrode and an evolution of hydrogen round the zinc negative electrode in accordance with the following reaction:

$$Ag + 2KOH + H_2O + 2Zn \rightarrow AgO + 2KOH + 2Zn + 2H \quad (3)$$

At the first discharge, the following reaction is produced:

$$AgO + 2KOH + 2Zn + H_2O \rightarrow Ag + Zn(OK)_2 + Zn(OH)_2 + 2H \quad (4)$$

with a further evolution of hydrogen round the zinc electrode.

The second charging is then executed and care is taken to stop it before the beginning of the electrolytic dissociation of the zincate of potassium $Zn(OK)_2$. The following electro-chemical reaction takes place:

$$Ag + Zn(OH)_2 \rightarrow AgO + H_2O + Zn \quad (2')$$

In other words, there is a very favorable production of water, about 0.33 gram per ampere hour, which allows ensuring the operation of the accumulator with a very small amount of electrolyte; on the other hand, as after the formation of the potassium zincate according to the reaction (4) the zinc no longer dissolves in the electrolyte, the amount of zinc required is a very reduced one, whereby the associated reductions in the amounts of zinc and electrolyte give the accumulator according to my invention a power to weight ratio that is much higher than in usual accumulators.

During the discharge following the just mentioned charge the opposite reaction takes place:

$$AgO + H_2O + Zn \rightarrow Ag + Zn(OH)_2 \quad (2'')$$

without any modification to the electrolyte beyond the disappearance of the water formed during the preceding charge.

It is thus apparent that, in principle, the reactions occur exactly as if the potassium zincate served merely as a carrier for the water appearing in the reactions 2' and 2'' while an oxidation of the silver electrode takes place during the charge and a hydroxidation of the zinc electrode during the discharge. It is apparent that such an operation requires no upkeep, the only precaution to be taken consisting in stopping the charge of the accumulator before the electrolytic dissociation of the potassium zincate begins.

During the formation of the accumulator, the zinc assumes a spongy structure and has been impregnated in the cellulosic paper element 4. This porous element that might as well be made of spun glass or like alkali-resisting substance allows providing for the absorption of the water formed at each charge whereas the compressed viscose foil governs the nature of the chemical reactions as disclosed precedingly. It may be noted that whereas the compression of the cellulose should be sufficient to avoid the dissolution of the zinc in the electrolyte, which dissolution is usual in standard accumulators, this compression should however not be high enough for slowing down the diffusion and reaction processes and thereby reducing the capacity of the accumulator through a lack of electrolyte. For this reason, it is preferable not to depart too greatly from the conditions disclosed with reference to Figs. 5 and 5a. However other conditions are possible according to the nature of the cellulosic material and its state when inserted between the electrodes and thicknesses and clearances different from those disclosed may produce satisfactory results.

In most applications, it is necessary to group several accumulator elements of the type illustrated in Fig. 1 in order to obtain the desired voltage and capacity. This grouping should be executed in accordance with standard technique; however, in the case of accumulators of the type considered, this grouping shows particular features that will appear from the description of Figs. 6 and 7.

In said figures is illustrated an accumulator including four independent containers of plastic material 10—11—12—13 each containing two cells of the type illustrated in Figs. 1 to 4. These two cells are connected in parallel and the output terminals of each container are connected in series as apparent from the wiring diagram of Fig. 8. The containers 10 to 13 are housed inside a reinforced frame 14 which latter includes two metal end plates 15 and 16 that are sufficiently thick so as not to be deformed under the action of the pressure prevailing between the accumulator cells; a belt 17 preferably of thin sheet metal holds the end plates at the desired spacing while a bottom 18 holds the containers at the desired level. It will be of advantage to give the plates 15 and 16 a convex curvature at the start as shown in dot and dash lines at 15′ and 16′ so that the internal pressure of the elements may restore them into substantially flat shape; this allows reducing to a minimum the thickness of these plates.

Of course my invention is by no means limited to the examples illustrated and numerous modifications may be considered without exceeding its scope as defined in accompanying claims.

What I claim is:

1. In an electrochemical generator of energy, in combination, a positive electrode and a negative electrode, one of said electrodes comprising an electrochemically active material and an electrolyte-permeable insulating envelope enclosing said material, said envelope being folded substantially in the form of a U with upwardly extending arms, the other of said electrodes being in contact with the outer surface of said envelope and comprising a metal sheet having portions respectively embracing the arms of the U.

2. In an electrochemical generator of energy, in combination, a positive electrode and a negative electrode, one of said electrodes comprising an electrochemically active material and an electrolyte-permeable insulating envelope enclosing said material, said envelope being folded substantially in the form of a U with upwardly extending arms, the other of said electrodes comprising a metal sheet having substantially the form of an H with horizontal legs, said sheet being wrapped around said envelope with each leg of the H folded about and embracing a respective arm of the U.

3. The combination according to claim 2, including a conductive terminal member inserted between the arms of the U and in contact with both legs of the H.

4. In an electrochemical generator of energy, in combination, a positive electrode and a negative electrode, said positive electrode comprising an electrochemically active powder and an electrolyte-permeable insulating envelope enclosing said powder, said envelope being folded substantially in the form of a U with upwardly extending arms, said negative electrode being in contact with the outer surface of said envelope and comprising a sheet of zinc having portions respectively embracing the arms of the U.

5. In an electrochemical generator of energy, in combination, a positive electrode and a negative electrode, said positive electrode comprising an electrochemically active powder and an electrolyte-permeable insulating envelope enclosing said powder, said envelope being folded substantially in the form of a U with upwardly extending arms, said negative electrode comprising a sheet of zinc having substantially the form of an H with horizontal legs, said sheet being wrapped around said envelope with each leg of the H folded about and embracing a respective arm of the U.

6. The combination according to claim 5, including a negative terminal and a conductive plate connected to said terminal, said plate being inserted between the arms of the U and in contact with both legs of the H.

7. In an electrochemical generator of energy, in combination, a positive electrode and a negative electrode, one of said electrodes comprising an electrochemically active material and an electrolyte-permeable insulating envelope enclosing said material, said envelope being folded substantially in the form of a U with upwardly extending arms, the other of said electrodes being in contact with the outer surface of said envelope and comprising a metal sheet having at least a portion embracing an arm of the U.

8. In an electrochemical generator of energy, in combination, a container, a positive electrode and a negative electrode in said container, at least one of said electrodes comprising an electrochemically active material and an electrolyte-permeable envelope enclosing said material, said envelope being folded substantially in the form of a U with upstanding arms, the other of said electrodes being positioned externally of and adjacent said envelope, and means including said container maintaining said other electrode in close contact with at least one of the arms of the U and keeping said electrodes and said envelope under compression.

HENRI G. ANDRÉ.

REFERENCES CITED

The following references are of record in the file of this patent:

UNITED STATES PATENTS

| Number | Name | Date |
| --- | --- | --- |
| 388,601 | Trippe | Aug. 28, 1888 |
| 842,616 | Bradbury | Jan. 29, 1907 |
| 942,279 | Perry | Dec. 7, 1909 |
| 1,486,434 | Holden | Mar. 11, 1924 |
| 1,955,115 | Drumm | Apr. 17, 1934 |
| 2,317,711 | Andre | Apr. 27, 1943 |
| 2,490,630 | Jardine | Dec. 6, 1949 |

FOREIGN PATENTS

| Number | Country | Date |
| --- | --- | --- |
| 21,472 | Great Britain | 1906 |